United States Patent
Yee et al.

(10) Patent No.: US 12,101,438 B2
(45) Date of Patent: Sep. 24, 2024

(54) COMPUTER-BASED SYSTEMS CONFIGURED FOR AUTOMATED EXTRACTION OF DATA FROM INPUTS AND METHODS OF USE THEREOF

(71) Applicant: Capital One Services, LLC, McLean, VA (US)

(72) Inventors: Bryant Yee, Washington, DC (US); Brian McClanahan, Silver Spring, MD (US); Cruz Vargas, Denver, CO (US)

(73) Assignee: Capital One Services, LLC, McLean, VA (US)

( * ) Notice: Subject to any disclaimer, the term of this patent is extended or adjusted under 35 U.S.C. 154(b) by 50 days.

(21) Appl. No.: 17/527,950

(22) Filed: Nov. 16, 2021

(65) Prior Publication Data
US 2023/0156123 A1    May 18, 2023

(51) Int. Cl.
| | |
|---|---|
| *H04M 3/00* | (2024.01) |
| *G06F 40/20* | (2020.01) |
| *G06V 40/16* | (2022.01) |
| *H04L 12/66* | (2006.01) |

(Continued)

(52) U.S. Cl.
CPC .......... *H04M 3/5141* (2013.01); *G06F 40/20* (2020.01); *G06V 40/16* (2022.01)

(58) Field of Classification Search
CPC .. H04M 3/5175; H04M 3/51; H04M 3/42221; H04M 3/5191; H04M 3/5183; H04M 3/5158; H04M 3/5166; H04M 3/4365; H04M 3/5141; H04M 3/5233; H04M 1/72403; H04M 2201/40; H04M 2203/357; H04M 3/42059; H04M 3/523; H04M 3/2218; G10L 15/26; G10L 25/63; G10L 25/78; G10L 15/1807; G10L 2015/088; G10L 15/22; G10L 13/08; G10L 15/1822; G06N 20/00; G06N 3/08; G06F 16/685; G06F 40/279; G06F 40/30; G06F 18/24; G06F 40/20; G06F 40/205; G06F 40/35; G06F 16/3329; G06F 40/40;

(Continued)

(56) References Cited

U.S. PATENT DOCUMENTS

| | | |
|---|---|---|
| 6,510,414 B1 * | 1/2003 | Chaves .............. H04M 3/51 704/270.1 |
| 7,818,195 B2 | 10/2010 | Coon et al. |
| 9,014,363 B2 | 4/2015 | Byrd et al. |

(Continued)

*Primary Examiner* — Kharye Pope
(74) *Attorney, Agent, or Firm* — Greenberg Traurig, LLP

(57) ABSTRACT

In some embodiments, the present disclosure provides an exemplary method that may include steps of receiving an input text data retrieved from a transcription associated with a previously recorded audio data file between a user of a plurality of users and an agent associated with a call center; identifying personal information associated with the user of the plurality of users from the input text data by inputting the input text data into a trained machine learning model; determining at least one key term within the personal information associated with the user of the plurality of users; automatically determining a confidence positivity score associated with the at least one key term; automatically extracting a plurality of tuples from the input text data; storing the plurality of tuples in an external database; and automatically generating a call script for conducting a subsequent call with the user.

20 Claims, 6 Drawing Sheets

(51) Int. Cl.
*H04M 3/51* (2006.01)
*H04M 5/00* (2006.01)

(58) Field of Classification Search
CPC ...... G06F 16/30; G06F 40/56; G06F 16/3322; G06F 16/2428
USPC ............ 379/265.09, 265.01, 265.11, 265.13, 379/266.01, 265.02
See application file for complete search history.

(56) References Cited

U.S. PATENT DOCUMENTS

| | | | |
|---|---|---|---|
| 10,002,639 B1* | 6/2018 | Gaeta | G10L 21/00 |
| 10,129,394 B2 | 11/2018 | Conway et al. | |
| 10,878,505 B1* | 12/2020 | Blair | G06F 18/24 |
| 11,011,160 B1* | 5/2021 | Villaizan | G10L 25/51 |
| 2003/0135512 A1* | 7/2003 | Morgan, Jr. | G06F 16/9566 707/999.102 |
| 2012/0116899 A1* | 5/2012 | Chesler | G06Q 30/016 705/16 |
| 2014/0074589 A1* | 3/2014 | Nielsen | G06Q 30/0271 705/14.43 |
| 2017/0187880 A1* | 6/2017 | Raanani | H04M 3/5175 |
| 2018/0096271 A1* | 4/2018 | Raanani | G06N 20/00 |
| 2019/0013038 A1* | 1/2019 | Thomson | G06F 40/20 |
| 2019/0373077 A1* | 12/2019 | Lepore | H04L 63/12 |
| 2021/0006656 A1* | 1/2021 | Gramacho | H04M 3/5191 |
| 2021/0334593 A1* | 10/2021 | Vo | G06N 5/02 |
| 2022/0375605 A1* | 11/2022 | Lipton | G06F 40/30 |
| 2022/0399006 A1* | 12/2022 | Jin | G10L 25/51 |

* cited by examiner

COMPUTER-BASED SYSTEMS CONFIGURED FOR AUTOMATED EXTRACTION OF DATA FROM INPUTS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for automated extraction of data from inputs and methods of use thereof.

BACKGROUND OF TECHNOLOGY

Typically, an agent within a call center may manually have to identify personal information and key words after the conclusion of a phone call with a customer, which decreases productivity of the call center and reduces the ability for instant recall of the identified personal information during a subsequent phone call with that customer.

SUMMARY OF DESCRIBED SUBJECT MATTER

In some embodiments, the present disclosure provides an exemplary technically improved computer-based method that includes at least the following steps of receiving, by at least one processor, an input text data retrieved from a transcription associated with a previously recorded audio data file between at least one user of a plurality of users and at least one agent associated with a call center; identifying, by the at least one processor, utilizing a natural language processing algorithm, personal information associated with the at least one user of the plurality of users from the input text data by inputting the input text data into a trained machine learning model including the natural language processing algorithm; determining, by the at least one processor, utilizing a tonal rule engine algorithm, at least one key term within the personal information associated with the at least one user of the plurality of users based on a perceived reaction of the at least one user when the at least one user spoke the at least one key term to the agent associated with the call center; automatically determining, by the at least one processor, based on a sentiment analysis of the at least one key term, a confidence positivity score associated with the at least one key term, where the confidence positivity score quantifies a plurality of factors associated with the sentiment analysis; automatically extracting, by the at least one processor, utilizing an information extraction algorithm, based, at least in part, on the sentiment analysis of the at least one key term within the input text data, a plurality of tuples from the input text data, where each tuple represents a relationship and an object; storing, by the at least one processor, the plurality of tuples in an external database; and automatically generating, by the at least one processor, based on the plurality of tuples, a call script for conducting, by the at least one agent associated with the call center, a subsequent call with the at least one user.

In some embodiments, the present disclosure provides an exemplary technically improved computer-based system that includes at least the following components of: at least one processor configured to execute software instructions that cause the at least one processor to perform steps to: receive, by at least one processor, an input text data retrieved from a transcription associated with a previously recorded audio data file between at least one user of a plurality of users and at least one agent associated with a call center; identify, by the at least one processor, utilizing a natural language processing algorithm, personal information associated with the at least one user of the plurality of users from the input text data by inputting the input text data into a trained machine learning model including the natural language processing algorithm; determine, by the at least one processor, utilizing a tonal rule engine algorithm, at least one key term within the personal information associated with the at least one user of the plurality of users based on a perceived reaction of the at least one user when the at least one user spoke the at least one key term to the agent associated with the call center; automatically determine, by the at least one processor, based on a sentiment analysis of the at least one key term, a confidence positivity score associated with the at least one key term, where the confidence positivity score quantifies a plurality of factors associated with the sentiment analysis; automatically extract, by the at least one processor, utilizing a term frequency inverse document frequency algorithm, based, at least in part, on the sentiment analysis of the at least one key term within the input text data, a plurality of tuples from the input text data, where each tuple represents a relationship and an object; store, by the at least one processor, the plurality of tuples in an external database; and automatically generate, by the at least one processor, based on the plurality of tuples, a call script for conducting, by the at least one agent associated with the call center, a subsequent call with the at least one user.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
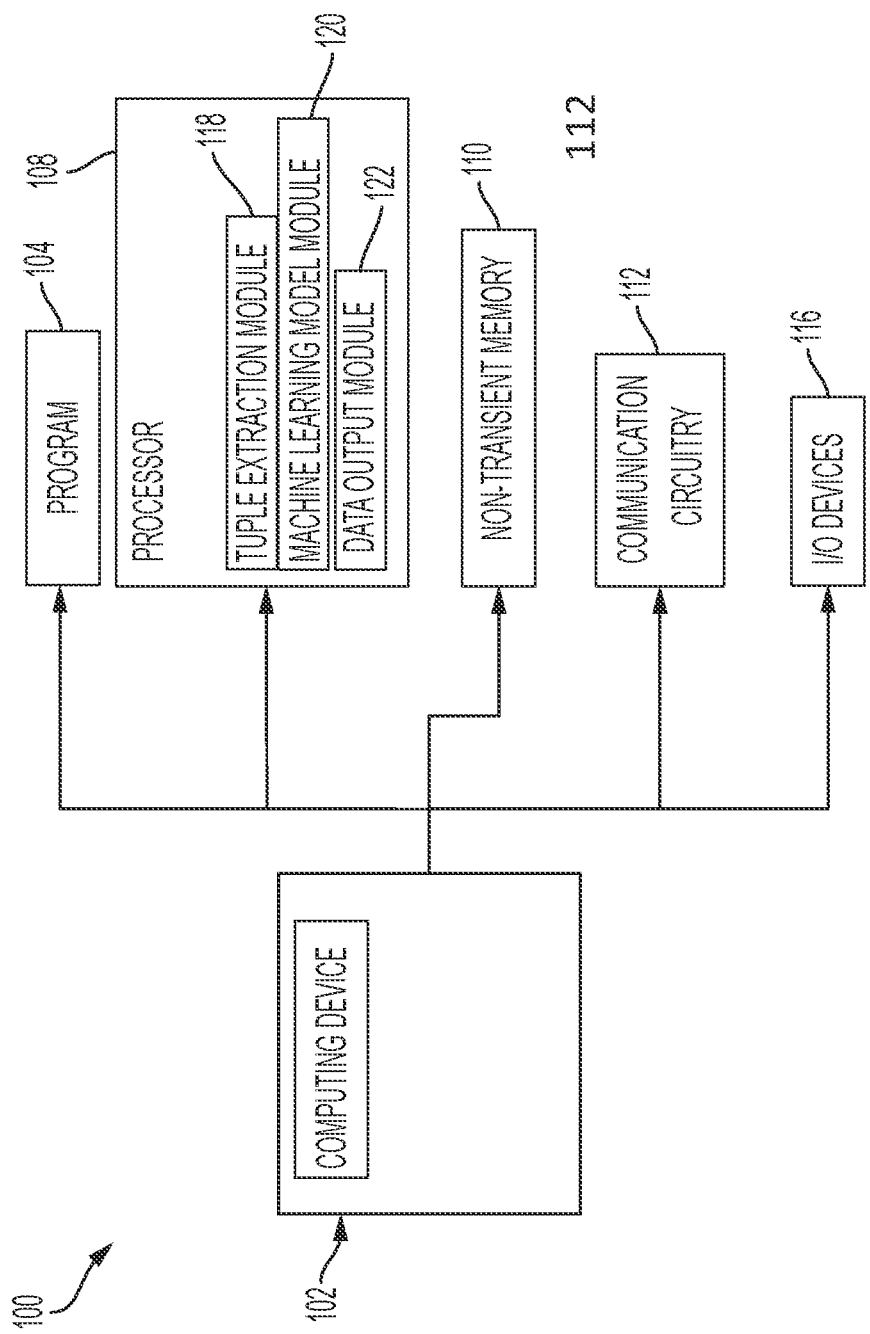
FIG. 1 is a block diagram show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments of the present disclosure recognize a technological computer-centered problem associated with repetitive identification of personal information within a transcription of an audio data file. The technological computer-centered problem associated with the repetitive identification of personal information arise primarily due to lack of sentient analysis and lack of a utilization of a plurality of artificial intelligence and machine learning algorithms. This technical computer-center problem is exacerbated in a plurality of interaction sessions, where each interaction session may be a phone call. In some instances, the repetitive identification of personal information for a plurality of transcriptions based on the plurality of interaction sessions is inefficient and reduces a number of interaction sessions a call agent may participate in based on time needed to identify personal information within the plurality of transcriptions. Embodiments of the present disclosure detail a computer-centric technological solution that may automatically generate a new call script for an agent of a call center to conduct a subsequent call with a user based on extracted key words from the personal information of the user by removing the need of input from the agent of the call center. In some embodiments, the computer centric technological solution may update content of an existing call script based on a recent call. In some embodiments, a practical solution may require determining a confidence positivity score associated with a determined key term to perform a sentiment analysis of personal information using a plurality of extraction techniques, specifically a term frequency inverse document frequency algorithm.

FIG. 1 depicts a block diagram of an exemplary computer-based system and platform for dynamically mapping a virtual account number to an actual financial account associated with a user, in accordance with at least one embodiment.

In some embodiments, a computing system 100 may include a computing device 102 associated with a user and an illustrative program engine 104. In some embodiments, the program 104 may be stored on the computing device 102. In some embodiments, the illustrative program engine 104 may reside on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example.

In some embodiments, the illustrative program engine 104 may be configured to instruct the processor 108 to execute one or more software modules such a tuple extraction module 118, a machine learning model module 120, and a data output module 122.

In some embodiments, an exemplary tuple extraction module 118, of the present disclosure, utilizes at least one machine learning algorithm described herein, to automatically determine at least one key term within identified personal information associated with a user. In some embodiments, the exemplary tuple extraction module 118 may receive an input text data from a transcription of a previously recorded audio data file. Typically, identification of personal information may require a manual input from an agent associated with a call center to identify at least one key word associated with the user. In some embodiments, the identification of personal information may comprise a plurality of personal information associated with at least one user in a plurality of users and the machine learning model module 120 utilizing a natural language processing algorithm engine 124. In some embodiments, the identified personal information may refer to names, locations, addresses, passwords, account information, banking information, and income information associated with the user. In some embodiments, the exemplary tuple extraction module 118 may identify personal information associated with the user from input text data by inputting the input text data into a statistical based model, where the statistical based model comprises the natural language processing algorithm 124. In some embodiments, the exemplary tuple extraction module 118 may determine at least one key term within the identified personal information associated with the user utilizing a tonal rule engine algorithm 126. Typically, a second user is required to manually highlight or mark potential key terms within the identified personal information without verification or analysis of the key terms. In some embodiments, the exemplary tuple extraction module 118 may determine the at least one key word within the identified personal information associated with the user based on a perceived reaction of the at least one user utilizing artificial intelligence algorithms to analyze a plurality of factors associated with the key term when the key term was spoken during the previously recorded audio data file. For example, the plurality of factors that may be analyzed for the key term spoken during the previously recorded audio data file are pitch deviation, cultural identification, length of silence, and different languages. In some embodiments, the exemplary tuple extraction module 118 may determine the at least one key word within the identified personal information associated with the user utilizing a facial recognition algorithm to perceive a reaction associated with the user. In some embodiments, the exemplary tuple extraction module 118 may automatically calculate a confidence positivity score associated with the key term based on a sentiment analysis of the identified personal information and a plurality of received user preferences associated with the identified personal information. In embodiments, the exemplary tuple extraction module 118 may receive the user preferences associated with identified personal information prior to the audio data file occurs. In some embodiments, the confidence positivity score may become a threshold of confidence that the user is comfortable with discussing the identified personal information. In some embodiments, the exemplary tuple extraction module 118 may automatically extract a plurality of tuples from the input text data based on the sentiment analysis of the key term utilizing a term frequency inverse document frequency ("TFIDF") algorithm 128. In some embodiments, the term tuple may refer to a relationship and an object, where the relationship may be between the user and the object. In some embodiments, the exemplary tuple extraction module 118 may automatically extract the plurality of tuples utilizing an entity recognition algorithm, where the entity recognition algorithm may refer to tuples associated with an entity instead of an individual as the user. In some embodiments, the exemplary tuple extraction module 118 may store the extracted plurality of tuples in an external database. In some embodiments, the exemplary tuple extraction module 118 may be the server computing device 106. In some embodiments, the exemplary tuple extraction module 118 may automatically generate a call script for conducting subsequent calls with the user based on the extracted plurality of tuples. In some embodiments, the exemplary tuple extraction module 118 may automatically initiate an interaction session with the user based on the generated call script using an automated voice calling service. In some embodiments, the exemplary tuple extraction module 118 may instruct the computing device 102 associated with an agent of the call center to display the extracted plurality of tuples associated with the user.

Embodiments of the present disclosure herein describe systems for utilizing the machine learning model module 120 for identifying personal information associated with a user by inputting the input text data associated with a previously recorded audio data file into the machine learning model module 120 to determine key terms and extract a plurality of tuples associated with the user. In some embodiments, the machine learning model module 120 may utilize the plurality of received user preferences to train a machine learning model to identify personal information within the recorded audio data file and determine the key terms within the identified personal information. In some embodiments, the machine learning model module 120 may utilize the natural language processing algorithm 124 to identify personal information associated with the user. In some embodiments, output of the machine learning model module 120 may be the determined key terms associated with the identified personal information based on the utilization of the natural language processing algorithm 124. In some embodiments, the output of the machine learning model module 120 may be the extracted plurality of tuples associated with the identified personal information.

In some embodiments, the data output module 122 may automatically extract the plurality of tuples from the identified personal information associated with the user based on the output of the machine learning model module 120, where the data output module 122 may utilize the TFIDF algorithm 128 to generate the call script for subsequent calls with the user. In some embodiments, the data output module 122 may display the extracted plurality of tuples associated with the user.

In some embodiments, the illustrative program engine 104 may receive the input text data from the transcription of the previously recorded audio data file. In some embodiments, the illustrative program engine 104 may identify the personal information associated with the user from the input text data by inputting the input text data into the machine learning model module 120. In some embodiments, the illustrative program engine 104 may determine the key terms within the identified personal information associated with the user utilizing the tonal rule engine algorithm 126. In some embodiments, the illustrative program engine 104 may automatically calculate the confidence positivity score associated with the key term based on the sentiment analysis of the identified personal information and the plurality of received user preferences associated with the identified personal information. In some embodiments, the illustrative program engine 104 may automatically extract the plurality of tuples from the input text data based on the sentiment analysis of the key term utilizing the TFIDF algorithm 128. In some embodiments, the program 104 may store the extracted plurality of tuples in the server computing device 106. In some embodiments, the illustrative program engine 104 may automatically generate the call script for conducting subsequent calls with the user based on the extracted plurality of tuples.

In some embodiments, the non-transient memory 110 may store the extracted plurality of tuples associated with the identified personal information. In some embodiments, the non-transient memory 110 may store the output of the data output module 122. In some embodiments, the non-transient memory 110 may store the output of the machine learning model module 120.

Figure 2:
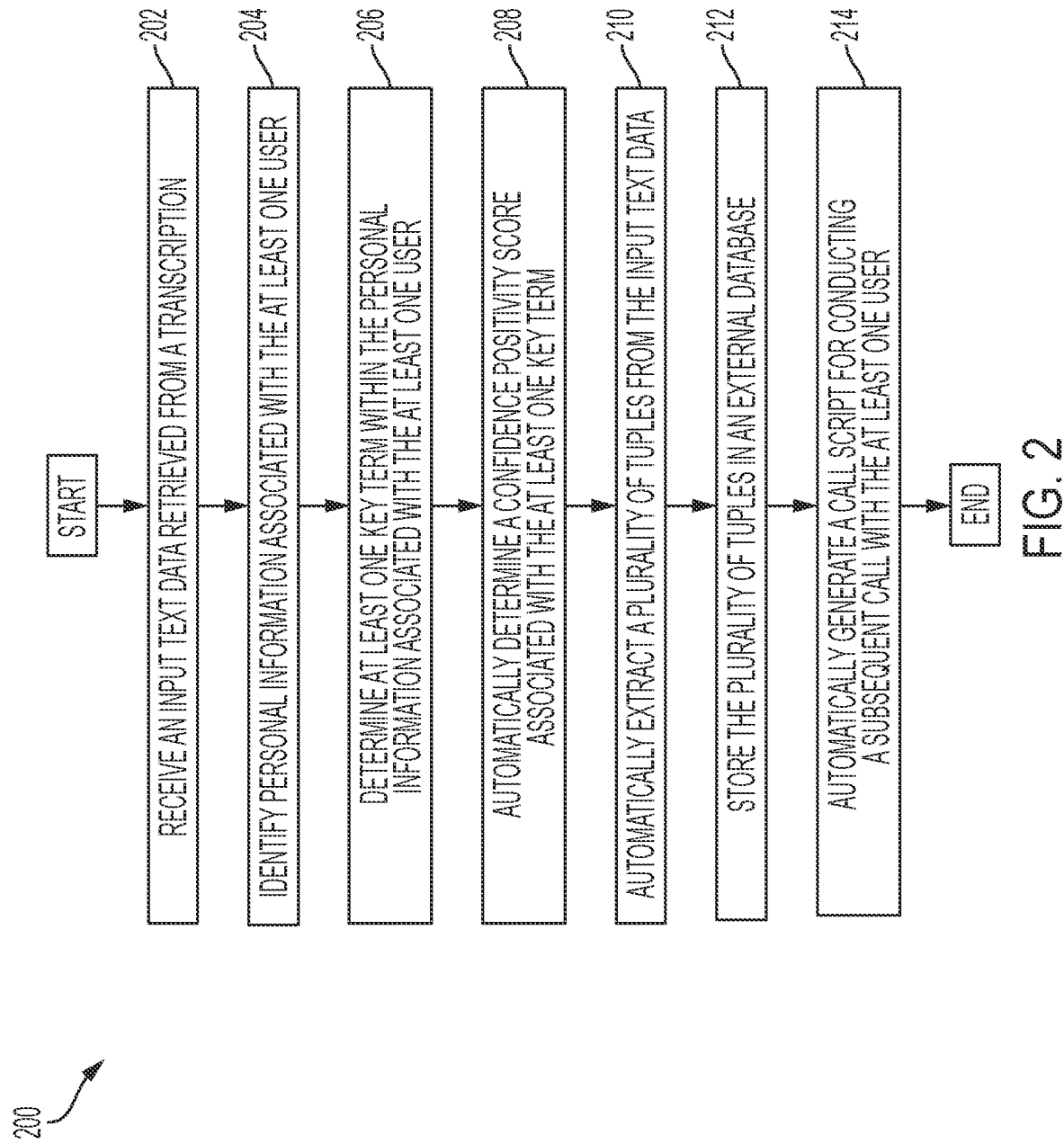
FIG. 2 is a flowchart illustrating operational steps for automatic extraction of a plurality of tuples associated with at least one user, in accordance with one or more embodiments of the present disclosure.

FIG. 2 is a flowchart 200 illustrating operational steps for automatic extraction of a plurality of tuples associated with at least one user, in accordance with one or more embodiments of the present disclosure.

In step 202, the illustrative program engine 104 within the computing device 102 may be programmed to receive input text data from a transcription associated with a previously recorded audio data file between at least one user of a plurality of users and at least one agent associated with a call center. In some embodiments, the previously recorded audio data file may be associated with a previously conducted phone call between the user and the agent.

In step 204, the illustrative program engine 104 may be programmed to identify personal information associated with the at least one user from the input text data. In some embodiments, the machine learning model module 120 may be programmed to identify the personal information based on the input text data utilizing the natural language processing algorithm 124. In some embodiments, the identified personal information may include names, locations, addresses, passwords, account information, banking information, and income information associated with the user.

In step 206, the illustrative program engine 104 may be programmed to determine at least one key term within the personal information associated with the at least one user. In some embodiments, the machine learning model module 120 may be programmed to determine the at least one key term within the identified personal information using the tonal rule engine algorithm 126. In some embodiments, the determined at least one key term may be based on a perceived reaction of the user from a previously recorded audio data file. In some embodiments, the perceived reaction may be acquired using the facial recognition algorithm.

In step 208, the illustrative program engine 104 may be programmed to automatically determine a confidence positivity score associated with the at least one key term. In some embodiments, the confidence positivity score may be calculated from a quantified plurality of factors associated with received preferences of the at least one user. In some embodiments, a sentiment analysis may be performed on the at least one key word to determine the confidence positivity score associated with the at least one user.

In step 210, the illustrative program engine 104 may be programmed to automatically extract a plurality of tuples from the input text data. In some embodiments, the plurality of tuples may be extracted based on the sentiment analysis of the at least one key term using the TFIDF algorithm 128. In some embodiments, each tuple may refer to a relationship and an object, where the relationship is between the at least one user and the object.

In step 212, the illustrative program engine 104 may be programmed to store the plurality of tuples in an external database. In some embodiments, the illustrative program engine 104 may store the plurality of tuples in the external database by generating a unique identifier associated with the at least one user to facilitate dynamic merging of additional information at a later period of time. In some embodiments, the plurality of tuples may be stored in the server computing device 106. In some embodiments, the plurality of tuples may be stored in the non-transient memory 110.

In step 214, the illustrative program engine 104 may be programmed to automatically generate a call script based on the extracted plurality of tuples. In some embodiments, the generated call script may be used for conducting subsequent calls with the at least one user by an agent of a call center. In some embodiments, the generated call script may be displayed on a computing device 102 associated with the agent of the call center to enhance the subsequent calls with the at least one user.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transactions/users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., tokenized PAN numbers, etc.) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

Figure 3:
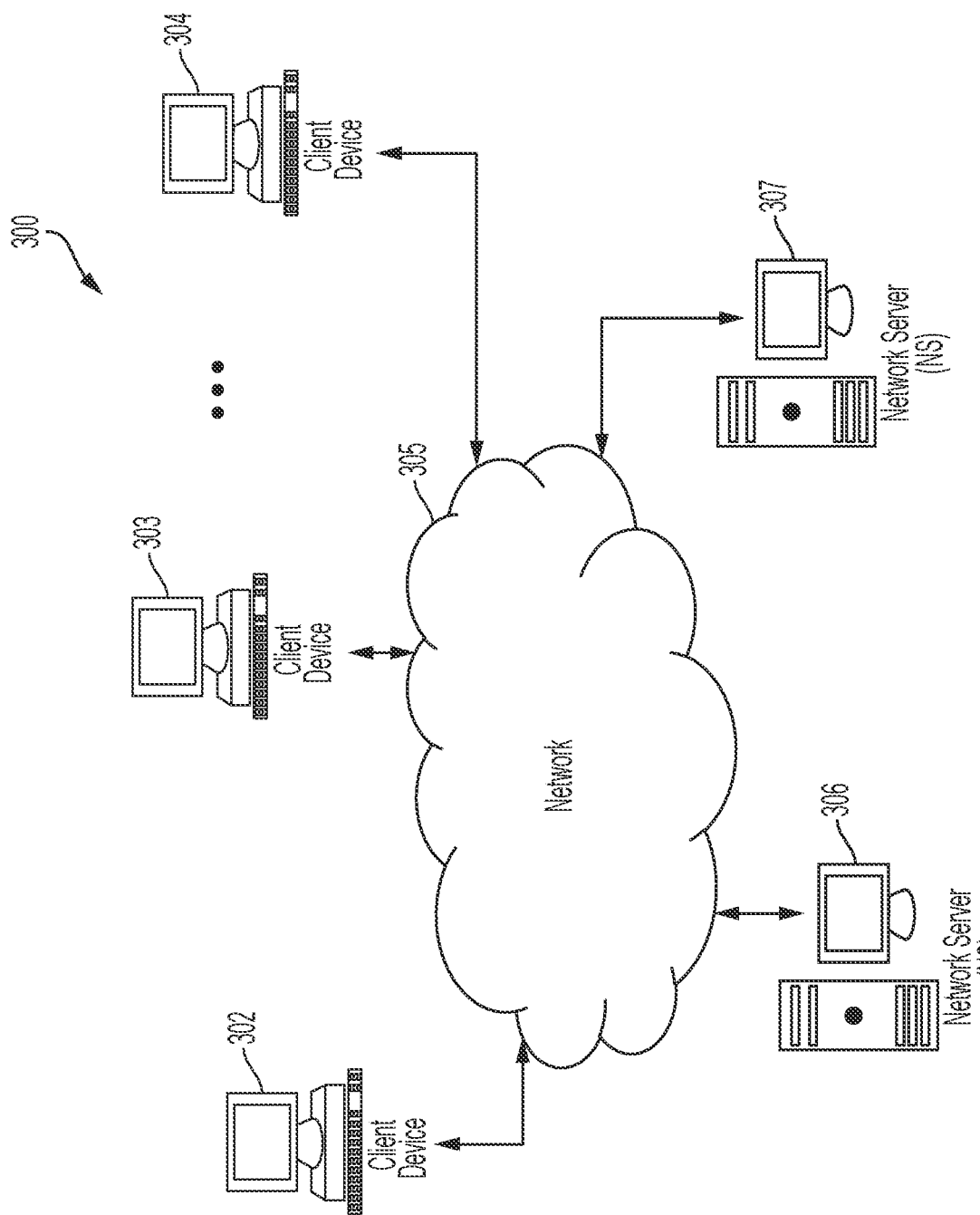
FIG. 3 depicts a block diagram of an exemplary computer-based system/platform in accordance with one or more embodiments of the present disclosure.

FIG. 3 depicts a block diagram of an exemplary computer-based system/platform 300 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 300 may be configured to manage a large number of members and/or concurrent transactions, as detailed herein. In some embodiments, the exemplary computer-based system/platform 300 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 300 may be configured to manage the exemplary ASR system of the present disclosure, utilizing at least one machine-learning model described herein.

In some embodiments, referring to FIG. 3, members 302-304 (e.g., clients) of the exemplary computer-based system/platform 300 may include virtually any computing device capable of receiving and sending a message over a network (e.g., cloud network), such as network 305, to and from another computing device, such as servers 306 and 307, each other, and the like. In some embodiments, the member devices 302-304 may be personal computers, multiprocessor systems, microprocessor-based or programmable consumer electronics, network PCs, and the like. In some embodiments, one or more member devices within member devices 302-304 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 302-304 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 302-304 may include may run one or more applications, such as Internet browsers, mobile applications, voice calls, video games, videoconferencing, and email, among others. In some embodiments, one or more member devices within member devices 302-304 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 302-304 may be specifically programmed by either Java, .Net, QT, C, C++ and/or other suitable programming language. In some embodiments, one or more member devices within member devices 302-304 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 305 may provide network access, data transport and/or other services to any computing device coupled to it. In some embodiments, the exemplary network 305 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 305 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 305 may include and implement, as an alternative or in conjunction with one or more of the above, a WiMAX architecture defined by the WiMAX forum. In some embodiments and, optionally, in combination of any embodiment described above or below, the exemplary network 305 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 305 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 305 may also include mass storage, such as network attached storage (NAS), a storage area network (SAN), a content delivery network (CDN) or other forms of computer or machine-readable media.

In some embodiments, the exemplary server 306 or the exemplary server 307 may be a web server (or a series of servers) running a network operating system, examples of which may include but are not limited to Microsoft Windows Server, Novell NetWare, or Linux. In some embodiments, the exemplary server 306 or the exemplary server 307 may be used for and/or provide cloud and/or network computing. Although not shown in FIG. 5, in some embodiments, the exemplary server 306 or the exemplary server 307 may have connections to external systems like email, SMS messaging, text messaging, ad content providers, etc. Any of the features of the exemplary server 306 may be also implemented in the exemplary server 307 and vice versa.

In some embodiments, one or more of the exemplary servers 306 and 307 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 301-304.

In some embodiments and, optionally, in combination of any embodiment described above or below, for example, one or more exemplary computing member devices 302-304, the exemplary server 306, and/or the exemplary server 307 may include a specifically programmed software module that may be configured to send, process, and receive information (e.g., transactions, VCNs, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 4:
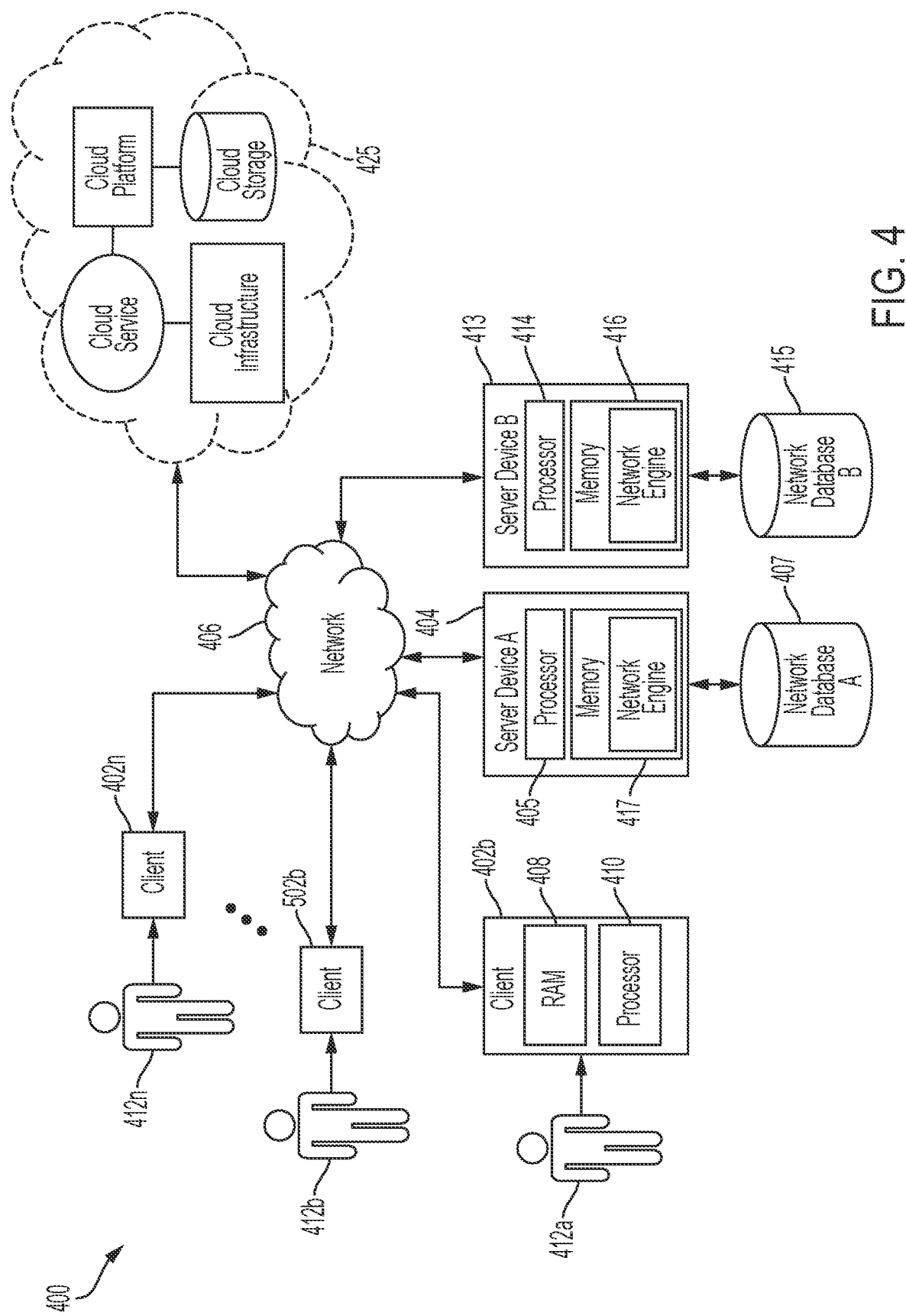
FIG. 4 depicts a block diagram of another exemplary computer-based system/platform in accordance with one or more embodiments of the present disclosure.

FIG. 4 depicts a block diagram of another exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 402a, 402b thru 402n shown each at least includes a computer-readable medium, such as a random-access memory (RAM) 408 coupled to a processor 410 or FLASH memory. In some embodiments, the processor 410 may execute computer-executable program instructions stored in memory 408. In some embodiments, the processor 410 may include a microprocessor, an ASIC, and/or a state machine. In some embodiments, the processor 410 may include, or may be in communication with, media, for example computer-readable media, which stores instructions that, when executed by the processor 410, may cause the processor 410 to perform one or more steps described herein. In some embodiments, examples of computer-readable media may include, but are not limited to, an electronic, optical, magnetic, or other storage or transmission device capable of providing a processor, such as the processor 410 of client 402a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 402a through 402n may also comprise a number of external or internal devices such as a mouse, a CD-ROM, DVD, a physical or virtual keyboard, a display, a speaker, or other input or output devices. In some embodiments, examples of member computing devices 402a through 402n (e.g., clients) may be any type of processor-based platforms that are connected to a network 406 such as, without limitation, personal computers, digital assistants, personal digital assistants, smart phones, pagers, digital tablets, laptop computers, Internet appliances, and other processor-based devices. In some embodiments, member computing devices 402a through 402n may be specifically programmed with one or more application programs in accordance with one or more principles/methodologies detailed herein. In some embodiments, member computing devices 402a through 402n may operate on any operating system capable of supporting a browser or browser-enabled application, such as Microsoft™ Windows™, and/or Linux. In some embodiments, member computing devices 402a through 402n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 402a through 402n, users, 412a through 412n, may communicate over the exemplary network 406 with each other and/or with other systems and/or devices coupled to the network 406. As shown in FIG. 4, exemplary server devices 404 and 413 may be also coupled to the network 406. Exemplary server device 404 may include a processor 405 coupled to a memory that stores a network engine 417. Exemplary server device 413 may include a processor 414 coupled to a memory 416 that stores a network engine. In some embodiments, one or more member computing devices 402a through 402n may be mobile clients. As shown in FIG. 4, the network 406 may be coupled to a cloud computing/architecture(s) 425. The cloud computing/architecture(s) 425 may include a cloud service coupled to a cloud infrastructure and a cloud platform, where the cloud platform may be coupled to a cloud storage.

In some embodiments, at least one database of exemplary databases 407 and 415 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 5:
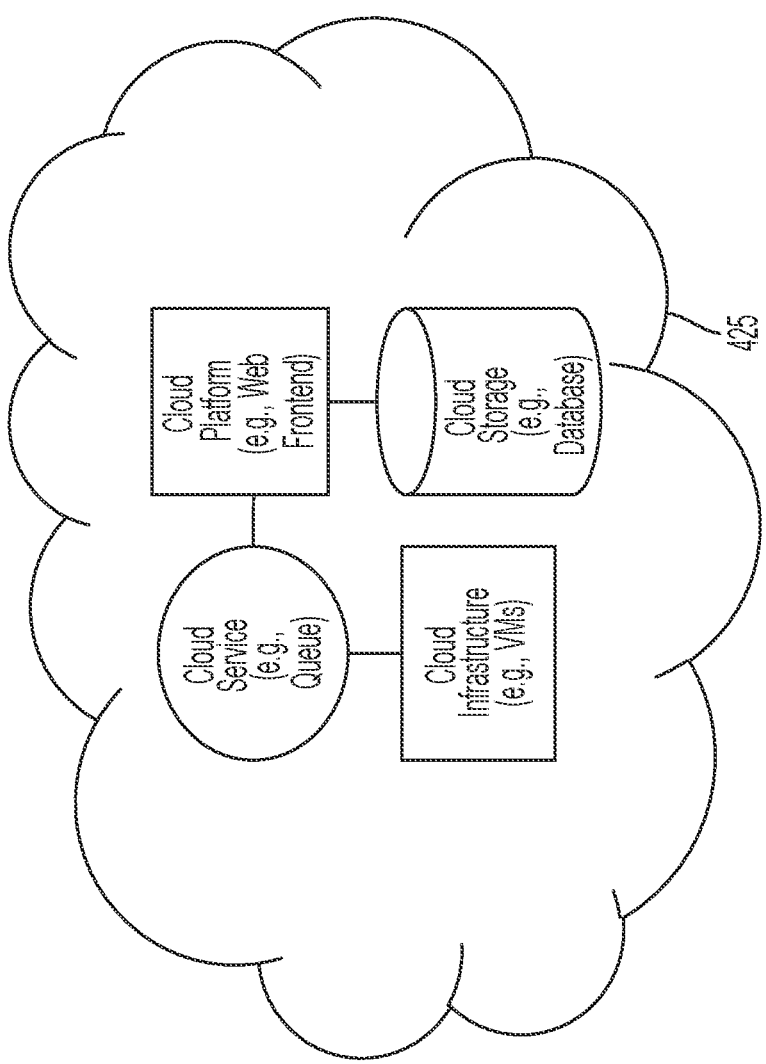
FIGS. 5 and 6 are diagrams illustrating implementations of cloud computing architecture/aspects with respect to which the disclosed technology may be specifically configured to operate, in accordance with one or more embodiments of the present disclosure.
Figure 6:
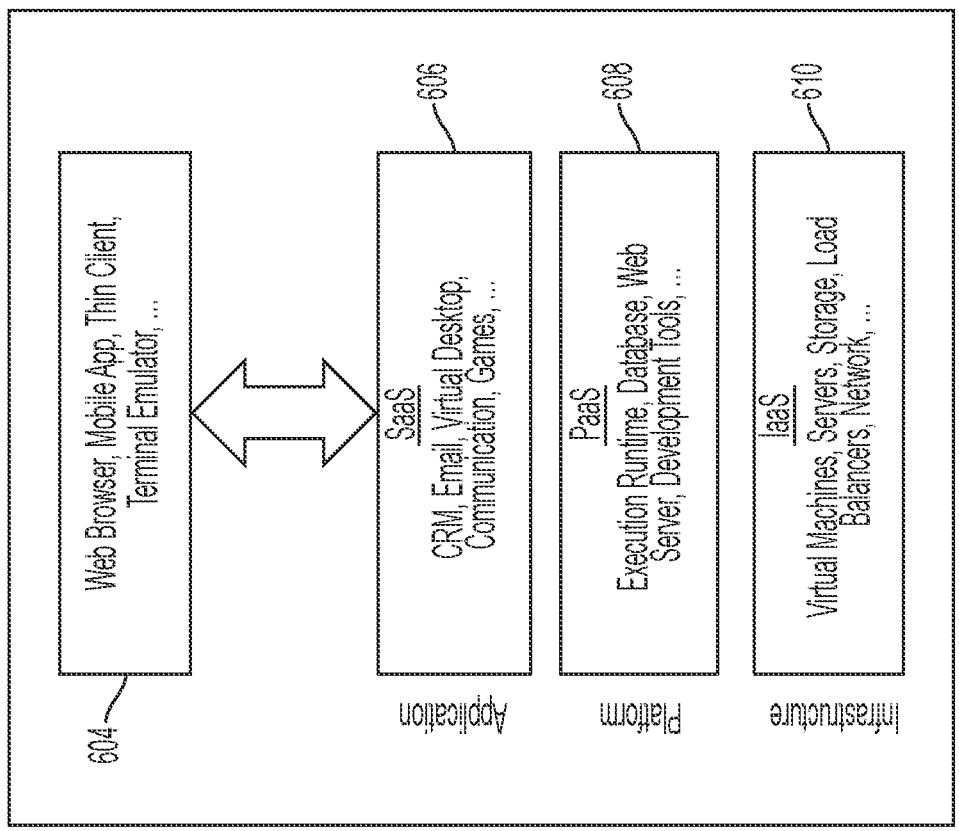

FIG. 5 and FIG. 6 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 5 illustrates an expanded view of the cloud computing/architecture(s) 425 found in FIG. 4. FIG. 6. illustrates the exemplary inventive computer-based components of the present disclosure may be specifically configured to operate in the cloud computing/architecture 425 as a source database 604, where the source database 604 may be a web browser. a mobile application, a thin client, and a terminal emulator. In FIG. 6, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 610, platform as a service (PaaS) 608, and/or software as a service (SaaS) 606.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, an artificial recurrent neural network model, a long short-term memory ("LSTM") model, and a distributed long short-term memory ("DLSTM") model, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
   receiving, by at least one processor, an input text data retrieved from a transcription associated with a previously recorded audio data file between at least one user of a plurality of users and at least one agent associated with a call center;
   identifying, by the at least one processor, utilizing a natural language processing algorithm, personal information associated with the at least one user of the plurality of users from the input text data by inputting the input text data into a trained machine learning model including the natural language processing algorithm;
   determining, by the at least one processor, utilizing a tonal rule engine algorithm, at least one key term within the personal information associated with the at least one user of the plurality of users based on a perceived reaction of the at least one user when the at least one user spoke the at least one key term to the agent associated with the call center;
   automatically determining, by the at least one processor, based on a sentiment analysis of the at least one key term, a confidence positivity score associated with the at least one key term, where the confidence positivity score quantifies a plurality of factors associated with the sentiment analysis;
   automatically extracting, by the at least one processor, utilizing a term frequency inverse document frequency algorithm, based, at least in part, on the sentiment analysis of the at least one key term within the input text data, a plurality of tuples from the input text data, where each tuple represents a relationship and an object;

storing, by the at least one processor, the plurality of tuples in an external database based on a generated unique identifier associated with the at least one user; and automatically generating, by the at least one processor, based on the plurality of tuples, a call script for conducting, by the at least one agent associated with the call center, a subsequent call with the at least one user.

2. The method according to clause 1, where identifying, utilizing the natural language processing algorithm, personal information associated with the at least one user of the plurality of users from the input text data by inputting the input text data into a statistical based model including the natural language processing algorithm.

3. The method according to clause 1 or 2, where determining the at least one key term within the personal information associated with the at least one user of the plurality of user includes a different user of the plurality of users actively highlighting the at least one key term within the input text data.

4. The method according to clause 1, 2 or 3, where determining the at least one key term within the personal information associated the at least one user of the plurality of users includes utilizing a facial recognition algorithm to perceive a reaction associated with the at least one user.

5. The method according to clause 1, 2, 3 or 4, where a sentiment analysis based on a utilization of the facial recognition algorithm to perceive the reaction associated with the at least one user.

6. The method according to clause 1, 2, 3, 4 or 5, where the plurality of factors include pitch deviation, cultural identification, length of silence, and different languages.

7. The method according to clause 1, 2, 3, 4, 5 or 6, where automatically extracting, based, at least in part, on the sentiment analysis of the at least one key term within the input text data, includes utilizing an entity recognition algorithm.

8. The method according to clause 1, 2, 3, 4, 5, 6 or 7, further including automatically initiating, by the processor, an interaction session with the at least one user based on an automatically generated call script associated with the plurality of tuples.

9. The method according to clause 1, 2, 3, 4, 5, 6, 7 or 8, further including instructing, by the processor, a computing device associated with the at least one agent of the call center to display the plurality of tuples associated with the at least one user.

10. A computer-implemented a method including:
receiving, by at least one processor, an input text data retrieved from a transcription associated with a previously recorded audio data file between at least one user of a plurality of users and at least one agent associated with a call center;
identifying, by the at least one processor, utilizing a natural language processing algorithm, personal information associated with the at least one user of the plurality of users from the input text data by inputting the input text data into a trained machine learning model including the natural language processing algorithm;
determining, by the at least one processor, utilizing a tonal rule engine algorithm, at least one key term within the personal information associated with the at least one user of the plurality of users based on a perceived reaction of the at least one user when the at least one user spoke the at least one key term to the agent associated with the call center;
automatically determining, by the at least one processor, based on a sentiment analysis of the at least one key term, a confidence positivity score associated with the at least one key term, where the confidence positivity score quantifies a plurality of factors associated with the sentiment analysis;
automatically extracting, by the at least one processor, utilizing a term frequency inverse document frequency algorithm, based, at least in part, on the sentiment analysis of the at least one key term within the input text data, a plurality of tuples from the input text data, where each tuple represents a relationship and an object;
storing, by the at least one processor, the plurality of tuples in an external database;
automatically generating, by the at least one processor, based on the plurality of tuples, a call script for conducting, by the at least one agent associated with the call center, a subsequent call with the at least one user; and
instructing, by the processor, a computing device associated with the at least one agent of the call center to display a generated call script and the plurality of tuples associated with the at least one user.

11. The method according to clause 10, where identifying, utilizing the natural language processing algorithm, personal information associated with the at least one user of the plurality of users from the input text data by inputting the input text data into a statistical based model including the natural language processing algorithm.

12. The method according to clause 10 or 11, where determining the at least one key term within the personal information associated with the at least one user of the plurality of user includes a different user of the plurality of users actively highlighting the at least one key term within the input text data.

13. The method according to clause 10, 11 or 12, where determining the at least one key term within the personal information associated the at least one user of the plurality of users includes utilizing a facial recognition algorithm to perceive a reaction associated with the at least one user.

14. The method according to clause 10, 11, 12 or 13, where a sentiment analysis based on a utilization of the facial recognition algorithm to perceive the reaction associated with the at least one user.

15. The method according to clause 10, 11, 12, 13 or 14, where the plurality of factors include pitch deviation, cultural identification, length of silence, and different languages.

16. The method according to clause 10, 11, 12, 13, 14 or 15, where automatically extracting, based, at least in part, on the sentiment analysis of the at least one key term within the input text data, includes utilizing an entity recognition algorithm.

17. A system including:
a non-transient computer memory, storing software instructions;
at least one processor of a first computing device associated with a user;

where, when the at least one processor executes the software instructions, the first computing device is programmed to:
receive, by at least one processor, an input text data retrieved from a transcription associated with a previously recorded audio data file between at least one user of a plurality of users and at least one agent associated with a call center;
identify, by the at least one processor, utilizing a natural language processing algorithm, personal information associated with the at least one user of the plurality of users from the input text data by inputting the input text data into a trained machine learning model including the natural language processing algorithm;
determine, by the at least one processor, utilizing a tonal rule engine algorithm, at least one key term within the personal information associated with the at least one user of the plurality of users based on a perceived reaction of the at least one user when the at least one user spoke the at least one key term to the agent associated with the call center;
automatically determine, by the at least one processor, based on a sentiment analysis of the at least one key term, a confidence positivity score associated with the at least one key term, where the confidence positivity score quantifies a plurality of factors associated with the sentiment analysis;
automatically extract, by the at least one processor, utilizing a term frequency inverse document frequency algorithm, based, at least in part, on the sentiment analysis of the at least one key term within the input text data, a plurality of tuples from the input text data, where each tuple represents a relationship and an object;
store, by the at least one processor, the plurality of tuples in an external database; and
automatically generating, by the at least one processor, based on the plurality of tuples, a call script for conducting, by the at least one agent associated with the call center, a subsequent call with the at least one user.

18. The system according to clause 17, where the software instructions to identify, utilizing the natural language processing algorithm, personal information associated with the at least one user of the plurality of users from the input text data by inputting the input text data into a statistical based model include the natural language processing algorithm.

19. The system according to clause 17 or 18, where the software instructions to determine the at least one key term within the personal information associated with the at least one user of the plurality of user include a different user of the plurality of users actively highlighting the at least one key term within the input text data.

20. The system according to clause 17, 18 or 19, where determining the at least one key term within the personal information associated the at least one user of the plurality of users includes utilizing a facial recognition algorithm to perceive a reaction associated with the at least one user While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:
1. A computer-implemented a method comprising:
receiving, by at least one processor, an input text data retrieved from a transcription associated with a previously recorded audio data file between at least one user of a plurality of users and at least one agent associated with a call center;
training, by the at least one processor, a machine learning model to analyze the input text data for personal information associated with the at least one user of the plurality of user;
identifying, by the at least one processor, utilizing a natural language processing algorithm, the personal information associated with the at least one user of the plurality of users from the input text data by inputting the input text data into the trained machine learning model comprising the natural language processing algorithm;
utilizing, by the at least one processor, a tonal rule engine algorithm of the trained machine learning model to determine at least one key term within the personal information associated with the at least one user of the plurality of users based on a perceived reaction of the at least one user when the at least one user spoke the at least one key term to the agent associated with the call center;
automatically determining, by the at least one processor, based on a sentiment analysis of the at least one key term, a confidence positivity score associated with the at least one key term, wherein the confidence positivity score quantifies a plurality of factors associated with the sentiment analysis, wherein the confidence positivity score comprises a threshold of confidence associated with the at least one user and the personal information;
automatically extracting, by the at least one processor, a plurality of tuples from the input text data by utilizing a term frequency inverse document frequency algorithm on the at least one key term within the input text data, wherein each tuple represents a relationship and an object, wherein the relationship is between the at least one user and the object;
storing, by the at least one processor, the plurality of tuples in an external database based on a generated unique identifier associated with the at least one user;
dynamically merging, by the at least one processor, based on the generated unique identifier, additional information related to the at least one user with the plurality of tuples at a subsequent period of time related to the input text data; and
automatically generating, by the at least one processor, based on the plurality of tuples with the additional information, a call script for conducting, by the at least one agent associated with the call center, a subsequent call with the at least one user.

2. The computer-implemented method of claim 1, wherein identifying, utilizing the natural language processing algorithm, personal information associated with the at least one user of the plurality of users from the input text data by inputting the input text data into a statistical based model comprising the natural language processing algorithm.

3. The computer-implemented method of claim 1, wherein determining the at least one key term within the personal information associated with the at least one user of the plurality of user comprises a different user of the plurality of users actively highlighting the at least one key term within the input text data.

4. The computer-implemented method of claim 1, wherein determining the at least one key term within the personal information associated the at least one user of the plurality of users comprises utilizing a facial recognition algorithm to perceive a reaction associated with the at least one user.

5. The computer-implemented method of claim 4, wherein a sentiment analysis based on a utilization of the facial recognition algorithm to perceive the reaction associated with the at least one user.

6. The computer-implemented method of claim 1, wherein the plurality of factors comprise pitch deviation, cultural identification, length of silence, and different languages.

7. The computer-implemented method of claim 1, wherein automatically extracting, based, at least in part, on the sentiment analysis of the at least one key term within the input text data, comprises utilizing an entity recognition algorithm.

8. The computer-implemented method of claim 1, further comprising automatically initiating, by the processor, an interaction session with the at least one user based on an automatically generated call script associated with the plurality of tuples.

9. The computer-implemented method of claim 1, further comprising instructing, by the processor, a computing device associated with the at least one agent of the call center to display the plurality of tuples associated with the at least one user.

10. A computer-implemented a method comprising:
   receiving, by at least one processor, an input text data retrieved from a transcription associated with a previously recorded audio data file between at least one user of a plurality of users and at least one agent associated with a call center;
   training, by the at least one processer, a machine learning model to analyze the input text data for personal information associated with the at least one user of the plurality of user;
   identifying, by the at least one processor, utilizing a natural language processing algorithm, the personal information associated with the at least one user of the plurality of users from the input text data by inputting the input text data into the trained machine learning model comprising the natural language processing algorithm;
   utilizing, by the at least one processor, a tonal rule engine algorithm of the trained machine learning model to determine at least one key term within the personal information associated with the at least one user of the plurality of users based on a perceived reaction of the at least one user when the at least one user spoke the at least one key term to the agent associated with the call center;
   automatically determining, by the at least one processor, based on a sentiment analysis of the at least one key term, a confidence positivity score associated with the at least one key term, wherein the confidence positivity score quantifies a plurality of factors associated with the sentiment analysis, wherein the confidence positivity score comprises a threshold of confidence associated with the at least one user and the personal information;
   automatically extracting, by the at least one processor, a plurality of tuples from the input text data by utilizing a term frequency inverse document frequency algorithm on the at least one key term within the input text data, wherein each tuple represents a relationship and an object, wherein the relationship is between the at least one user and the object;
   storing, by the at least one processor, the plurality of tuples in an external database;
   generating, by the at least one processor, a unique identifier associated with the at least one user;
   dynamically merge, based on the unique identifier, additional information related to the at least one user with the plurality of tuples at a subsequent period of time;
   automatically generating, by the at least one processor, based on the plurality of tuples and the additional information, a call script for conducting, by the at least one agent associated with the call center, a subsequent call with the at least one user; and
   instructing, by the processor, a computing device associated with the at least one agent of the call center to display a generated call script and the plurality of tuples associated with the at least one user.

11. The computer-implemented method of claim 10, wherein identifying, utilizing the natural language processing algorithm, personal information associated with the at least one user of the plurality of users from the input text data by inputting the input text data into a statistical based model comprising the natural language processing algorithm.

12. The computer-implemented method of claim 10, wherein determining the at least one key term within the personal information associated with the at least one user of the plurality of user comprises a different user of the plurality of users actively highlighting the at least one key term within the input text data.

13. The computer-implemented method of claim 10, wherein determining the at least one key term within the personal information associated the at least one user of the plurality of users comprises utilizing a facial recognition algorithm to perceive a reaction associated with the at least one user.

14. The computer-implemented method of claim 13, wherein a sentiment analysis based on a utilization of the facial recognition algorithm to perceive the reaction associated with the at least one user.

15. The computer-implemented method of claim 10, wherein the plurality of factors comprise pitch deviation, cultural identification, length of silence, and different languages.

16. The computer-implemented method of claim 10, wherein automatically extracting, based, at least in part, on the sentiment analysis of the at least one key term within the input text data, comprises utilizing an entity recognition algorithm.

17. A system comprising:
   a non-transient computer memory, storing software instructions;
   at least one processor of a first computing device associated with a user;

wherein, when the at least one processor executes the software instructions, the first computing device is programmed to:
- receive, by at least one processor, an input text data retrieved from a transcription associated with a previously recorded audio data file between at least one user of a plurality of users and at least one agent associated with a call center;
- train, by the at least one processor, a machine learning model to analyze the input text data for personal information associated with the at least one user of the plurality of user;
- identify, by the at least one processor, utilizing a natural language processing algorithm, the personal information associated with the at least one user of the plurality of users from the input text data by inputting the input text data into the trained machine learning model comprising the natural language processing algorithm;
- utilize, by the at least one processor, a tonal rule engine algorithm of the trained machine learning model to determine at least one key term within the personal information associated with the at least one user of the plurality of users based on a perceived reaction of the at least one user when at least one user spoke the at least one key term to the agent associated with the call center;
- automatically determine, by the at least one processor, based on a sentiment analysis of the at least one key term, a confidence positivity score associated with the at least one key term, wherein the confidence positivity score quantifies a plurality of factors associated with the sentiment analysis, wherein the confidence positivity score comprises a threshold of confidence associated with the at least one user and the personal information;
- automatically extract, by the at least one processor, a plurality of tuples from the input text data by utilizing a term frequency inverse document frequency algorithm on the at least one key term within the input text data, wherein each tuple represents a relationship and an object, wherein the relationship is between the at least one user and the object;
- store, by the at least one processor, the plurality of tuples in an external database;
- generate, by the at least one processor, a unique identifier associated with the at least one user;
- dynamically merge, based on the unique identifier, additional information related to the at least one user with the plurality of tuples at a subsequent period of time; and
- automatically generating, by the at least one processor, based on the plurality of tuples and the additional information, a call script for conducting, by the at least one agent associated with the call center, a subsequent call with the at least one user.

18. The system of claim 17, wherein the software instructions to identify, utilizing the natural language processing algorithm, personal information associated with the at least one user of the plurality of users from the input text data by inputting the input text data into a statistical based model comprise the natural language processing algorithm.

19. The system of claim 17, wherein the software instructions to determine the at least one key term within the personal information associated with the at least one user of the plurality of user comprise a different user of the plurality of users actively highlighting the at least one key term within the input text data.

20. The system of claim 17, wherein determining the at least one key term within the personal information associated the at least one user of the plurality of users comprises utilizing a facial recognition algorithm to perceive a reaction associated with the at least one user).

* * * * *